United States Patent
Cochrane et al.

(10) Patent No.: US 12,220,751 B2
(45) Date of Patent: Feb. 11, 2025

(54) ROBOTIC DRILL SYSTEM AND METHOD OF DRILLING WITH A ROBOTIC DRILL SYSTEM

(71) Applicant: The Boeing Company, Chicago, IL (US)

(72) Inventors: Jason John Cochrane, Melbourne (AU); Leng Benjamin Vongchanh, Melbourne (AU); Ashkan Amirsadri, Melbourne (AU)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 17/572,843

(22) Filed: Jan. 11, 2022

(65) Prior Publication Data

US 2022/0331975 A1 Oct. 20, 2022

Related U.S. Application Data

(60) Provisional application No. 63/175,781, filed on Apr. 16, 2021.

(51) Int. Cl.
| | |
|---|---|
| *B23B 31/40* | (2006.01) |
| *B23B 39/14* | (2006.01) |
| *B23B 49/02* | (2006.01) |
| *B25J 11/00* | (2006.01) |
| *B25J 13/08* | (2006.01) |

(52) U.S. Cl.
CPC .......... *B23B 31/4006* (2013.01); *B23B 39/14* (2013.01); *B23B 49/02* (2013.01); *B25J 11/005* (2013.01); *B25J 13/08* (2013.01); *B23B 2231/26* (2013.01); *B25J 11/0055* (2013.01)

(58) Field of Classification Search
CPC ..... B23B 31/4006; B23B 39/14; B23B 49/02; B25J 11/005; B25J 13/08
See application file for complete search history.

(56) References Cited

U.S. PATENT DOCUMENTS

| | | | | |
|---|---|---|---|---|
| 3,514,116 A | * | 5/1970 | Brinkman | B23B 31/4006 |
| | | | | 279/131 |
| 8,225,508 B2 | * | 7/2012 | Houis | B23B 47/287 |
| | | | | 29/525.01 |
| 9,061,419 B2 | * | 6/2015 | Kranz | B25J 9/1633 |

(Continued)

FOREIGN PATENT DOCUMENTS

| | | | |
|---|---|---|---|
| CN | 105583423 A | * | 5/2016 |
| DE | 202011052431 U1 | | 3/2013 |

(Continued)

*Primary Examiner* — Eric A. Gates
(74) *Attorney, Agent, or Firm* — Yee & Associates, P.C.

(57) ABSTRACT

A robotic drill system and a method of drilling with a robotic drill system. This includes inserting a tool head of the robotic drill within a hole of a drill template along an initial insertion trajectory with a robotic manipulator arm that is moved by at least one robotic actuator for causing robotic insertion of the tool head. In response to sensing binding of the tool head to a wall of the hole while inserting the tool head along the initial insertion trajectory, the disclosure includes stopping robotic insertion of the tool head and activating a self-centering device of the tool head to reorient the tool head to a corrected alignment of the tool head axis relative to the hole. The self-centering device may include an expandable collet.

20 Claims, 7 Drawing Sheets

(56) References Cited

U.S. PATENT DOCUMENTS

| | | | | |
|---|---|---|---|---|
| 9,789,549 B2* | 10/2017 | Nguyen | ................... | B23B 47/34 |
| 9,796,075 B2* | 10/2017 | Wang | ....................... | B23B 31/42 |
| 2006/0104711 A1* | 5/2006 | Muller | ................ | B23B 31/2073 |
| | | | | 403/337 |
| 2022/0214658 A1* | 7/2022 | Ros Vega | ........... | B23Q 17/2428 |

FOREIGN PATENT DOCUMENTS

| | | |
|---|---|---|
| WO | 2016081443 A1 | 5/2016 |
| WO | 2019059825 A1 | 3/2019 |

* cited by examiner

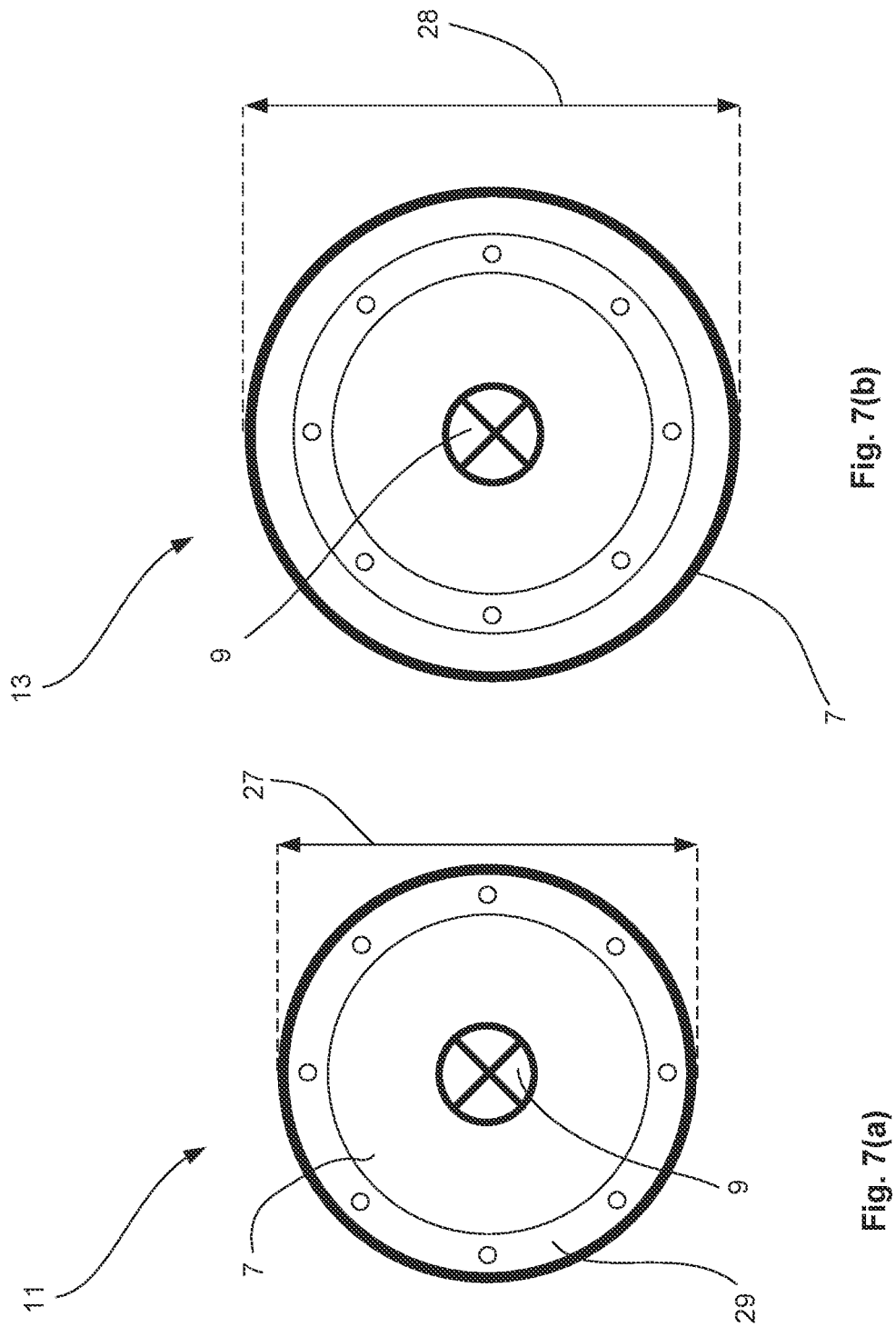

ROBOTIC DRILL SYSTEM AND METHOD OF DRILLING WITH A ROBOTIC DRILL SYSTEM

CROSS-REFERENCE TO RELATED APPLICATIONS

This application claims priority to, and the benefit of, U.S. Provisional Patent Application No. 63/175,781 filed Apr. 16, 2021 (now expired), which is hereby incorporated by reference in its entirety.

FIELD

The present disclosure generally relate of robotic drilling. More specifically, the disclosed examples relate to a robotic drill system, method, and a computer-implemented method of robotic drilling using a drill template.

BACKGROUND

When performing robotic peg-in-hole operations, such a robotic drilling using a hole in a drill template, the robot must first detect the hole. One approach is to use laser scanners to precisely locate surface features which can be highly accurate but slow. Another approach is to use calibrated vision system which can be faster but less accurate.

For power fed drills, the peg to hole tolerance can be very tight. The combination of metrology error and positional accuracy of robotic system may inhibit low cost robotic systems to achieve the required alignment for the peg-in hole operations. In particular achieving a correct alignment between a drill head (the peg) and the hole of the drill template without binding. Other system may increase accuracy by increasing system stiffness with larger and more expensive robots and factory infrastructure. However, such solutions may not be practical for mobile robotic drilling systems due to localization error and drill template registration error.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

The present disclosure provides for a robotic drill system including a tool head, a robotic manipulator arm to support the tool head, at least one robotic actuator, and at least one sensor. The tool head includes an expandable collet and an end effector, wherein the expandable collet is configured to expand between a retracted configuration for insertion into a hole of a drill template and an expanded configuration. The at least one robotic actuator is configured to move the robotic manipulator arm for causing robotic insertion of the tool head towards the hole of the drill template. The at least one sensor is configured to detect binding of the expandable collet within the hole of the drill template. In response to detecting binding of the expandable collet within the hole, robotic insertion of the tool head is stopped and the expandable collet is configured to expand to the expanded configuration to center the end effector in the hole. A retracted diameter of the expandable collet in the retracted configuration is at least 95%, but less than 100%, of a template hole diameter of the hole.

The present disclosure also provides a method of drilling with a robotic drill system. The method includes inserting a tool head of the robotic drill within a hole of a drill template along an initial insertion trajectory with a robotic manipulator arm that is moved by at least one robotic actuator for causing robotic insertion of the tool head. The method also includes sensing binding of the tool head to a wall of the hole. In response to binding of the tool head to a wall of the hole while inserting the tool head along the initial insertion trajectory, the method includes stopping robotic insertion of the tool head and activating a self-centering device of the tool head to reorient the tool head to a corrected alignment of the tool head axis relative to the hole. The method also includes inserting the tool head into the hole along an updated insertion trajectory, wherein the updated insertion trajectory is based on the corrected alignment. The method includes activating an end effector of the tool head.

The present disclosure provides a non-transitory computer-readable storage medium that has computer-readable program code stored therein that, when executed by a processor, causes a computer system to at least: compute initial control signals to robotic actuators for inserting a tool head of the robotic drill towards a hole of a drill template along an initial insertion trajectory; send control signals to robotic actuators to insert the tool head towards the hole along the initial insertion trajectory; and receive sensor signals indicative of binding of the tool head to a wall of the hole. The computer-readable program causes the computer system to: determine, based on the sensor signals, binding of the tool head to the wall of the hole and in response, send an activation control signal to activate a self-centering device of the tool head to reposition the tool head to a corrected alignment relative to the hole; compute, based on the corrected alignment of the tool head relative to the hole, an updated insertion trajectory; send updated control signals to robotic actuators to insert the tool head towards the hole along the updated insertion trajectory; and send an end effector control signal to activate an end effector of the tool head.

BRIEF DESCRIPTION OF THE DRAWINGS

FIG. 2(a) illustrates binding of the tool head during insertion in the initial insertion trajectory;

FIG. 2(b) illustrates activating the self-centering device at the tool head, such as expanding the expandable collet 7;

FIG. 2(c) illustrates the tool head reoriented to a corrected alignment due to activation of the self-centering device;

FIG. 2(d) illustrates the tool head at a corrected alignment with the self-centering device deactivated;

FIG. 2(e) illustrates inserting the tool head along an update insertion trajectory;

FIG. 2(f) illustrates activating the self-centering device to secure the tool head to the hole and activating the end effector 9;

FIG. 7(a) illustrates an end view of the tool head in the retracted configuration; and FIG. 7(b) illustrates an end view of the tool head in the expanded configuration.

DETAILED DESCRIPTION

Overview

Figure 1:
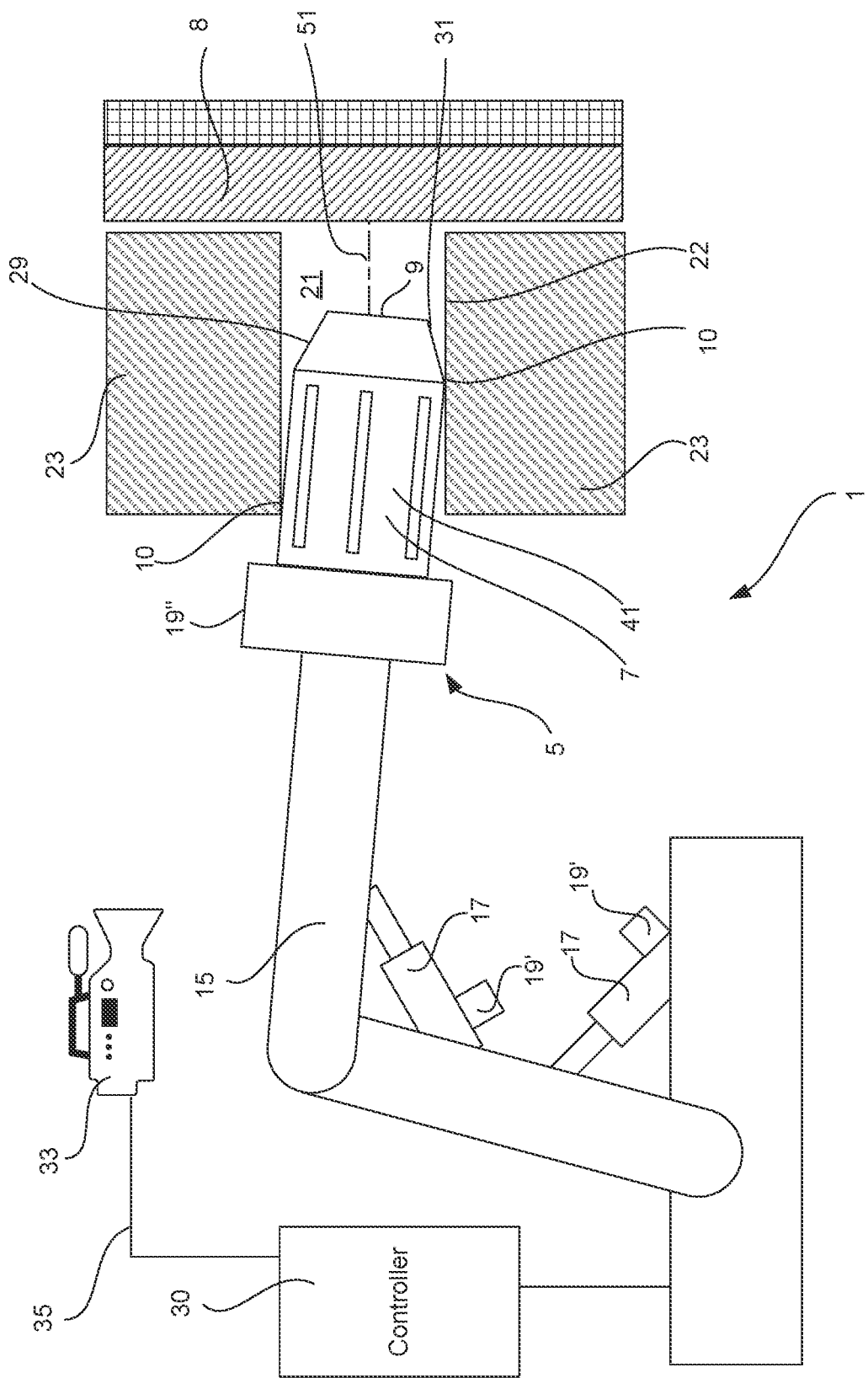
FIG. 1 illustrates a schematic of an exemplary embodiment of a robotic drill system.
Figure 2:
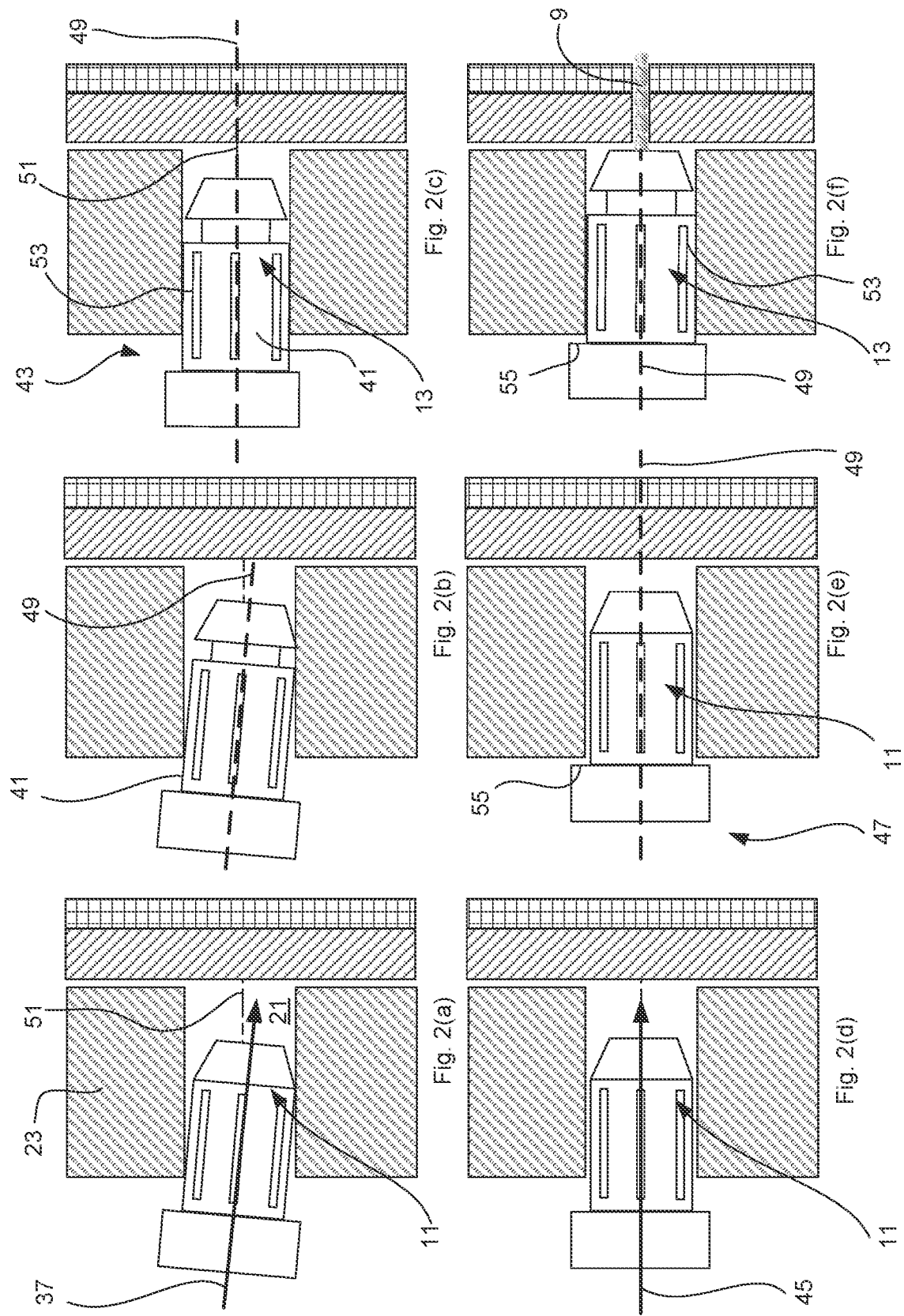
FIGS. 2(a) to 2(f) illustrates a sequence of a tool head of the robotic drill system inserting into a hole of a drill template.
Figure 3:
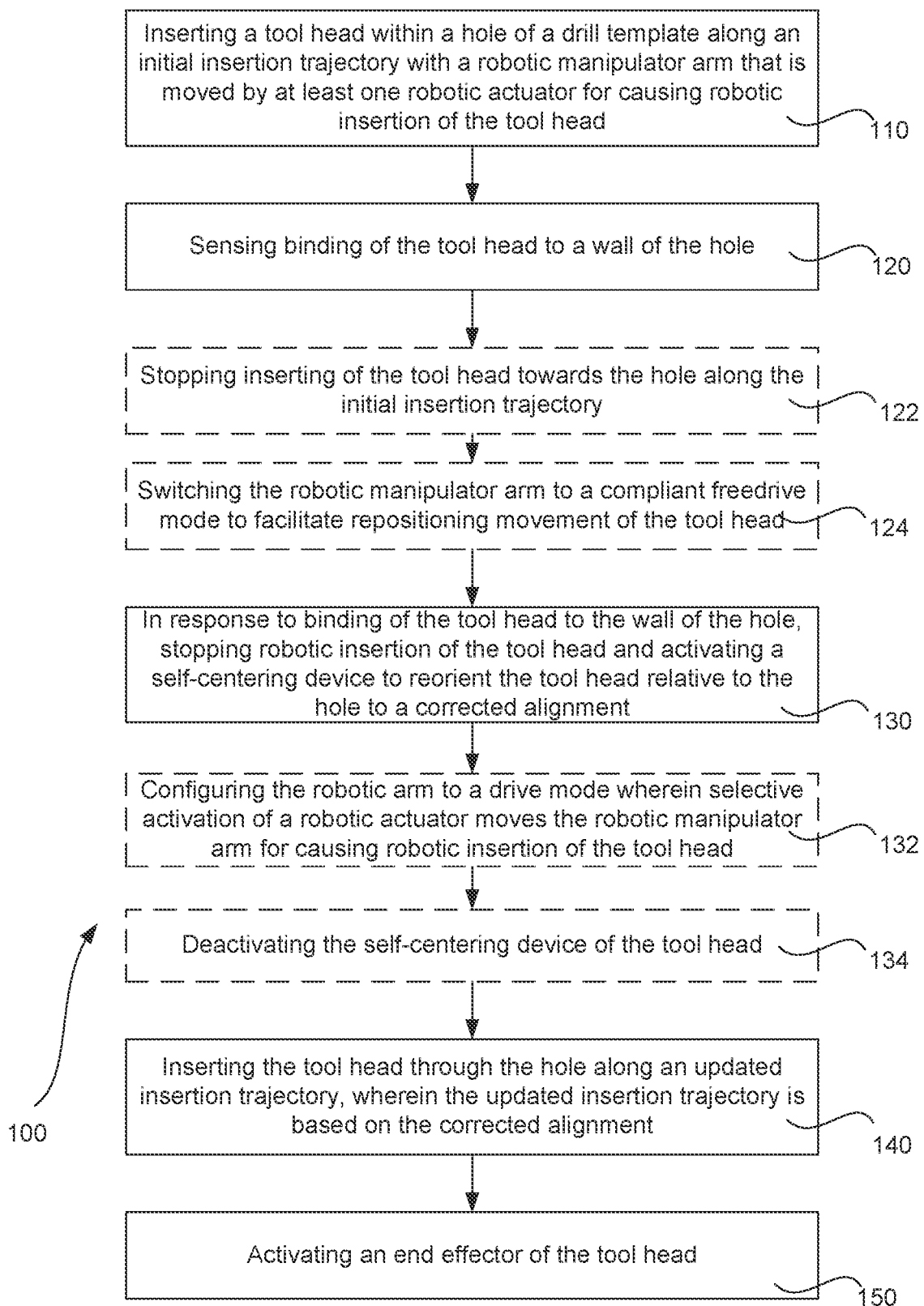
FIG. 3 is a flow diagram of an exemplary embodiment of a method of drilling with a robotic drill system.

FIG. 1 illustrates an example of a robotic drill system 1 to activate an end effector 9 at a work piece 8. FIG. 3 illustrates a method 100 of drilling with the robotic drill system 1 which is exemplified by the sequence illustrated in FIGS. 2a to 2(f).

The robotic drill system 1 is used with a drill template 23 having one or more holes 21 that correspond to location(s) for an end effector 9 of a tool head 5 to perform operations on the work piece 8. The drill template 23 is used as a jig to guide the tool head 5 to the work piece.

The robotic drill system 1 includes a robotic manipulator arm 15 to support a tool head 5. One or more robotic actuators 17 are provided to move the robotic manipulator arm to cause robotic insertion 110 of the tool head 5 towards the hole 21 of the drill template 23.

The tool head 5 includes a selectively activated self-centering device 41 and an end effector 9. In some particular examples, the self-centering device 41 is an expandable collet 7 that is configured to expand between a retracted configuration 11 for insertion into the hole 21 and an expanded configuration 13. The end effector 9 performs operations on the work piece 8 and can, for example, include a drill bit, a cutting tool, or other tool head.

The robotic drill system 1 also includes at least one sensor 19 to detect binding of the tool head 5 within the hole 21 of the drill template 23. This can include sensing (120) binding of at least part of the self-centering device 41 or expandable collet 7 to the hole 21.

If binding is detected during robotic insertion of the tool head 5 towards the hole 5, the robotic drill system 1, in response, stops robotic insertion. The self-centering device is activated 130 to correct the alignment of the tool head 5. In the specific example of the expandable collet 7, this includes expanding the diameter of the expandable collet 7 towards the wall 2 of the hole 21. In this expanded configuration 13, the expandable collet 7 centers the tool head 3 and the end effector 9 in the hole 21.

Subsequent to correcting the alignment of the tool head 5, the robotic manipulator arm can insert 140 the tool head 5 into the hole 21 along an updated trajectory that is based on the corrected alignment 43. This enables the tool head 5 to be inserted into a desired specified position 47 where the end effector 9 can be activated 150 to perform operations on the work piece 8.

The robotic drill system 1 and method 100 enables accurate placement of the end effector 9 in the drill template 23. In particular, using the self-centering device 41, such as an expandable collet 7, to correct alignment of the tool head 5. This can be advantageous for systems using utilizing lower precision sensors and components that have difficulties precisely locating a tool head 5 with the negative result of the tool head 5 binding to the template 23.

A detailed example of components of the robotic drill system 1 will now be described:

Tool Head 5

Referring to FIGS. 1, 7(a) and 7(b), the tool head 5 includes an end effector 9 to perform operations on the work piece 8 and a self-centering device 41 to correct the alignment of the end effector 9.

The tool head 5 may include other components, such as the sensors 19 to detect binding, collet sensors 53 to detect forces at self-centering device 41, and actuators to drive the end effector 9.

End Effector 9

The end effector 9 performs operation on the work piece 8. This can include a subtractive manufacturing operation (a.k.a. deductive manufacturing operation). In one example, the end effector 9 includes a drill with a drill bit. The end effector may include, or be associated with a rotary actuator such as a motor, to selectively rotate the drill bit to drill into the work piece 8.

In some examples, at least part of the end effector 9 is linearly extendible relative to other portions of the tool head 3 (such as the expandable collet 7) along a tool head axis 49. This can assist in drilling whilst maintaining a remaining portion of the tool head 5 stationary.

Self-Centering Device 41

The self-centering device 41 is configured to center the end effector 9 in the center of the hole 21 (which includes aligning the end effector 9 in the hole 21). This can be achieve with the self-centering device 41 of the tool head 5 imparting forces against the wall 22 of the hole 22 such that the relative position of the end effector 9 is centered with the hole 21.

In some examples, the self-centering device 41 includes an expandable collet 7 where the outer diameter of the expandable collet 7 is selectively adjustable (which will be described in further detail below). In other examples, the self-centering device 41 includes a plurality of radially extendable arms, whereby the selective distance between the distal ends of each extendable arm to a center are synchronized. It is to be appreciated that other centering devices may be adapted to center the end effector 9.

Expandable Collet 7

In the illustrated example shown in FIGS. 1, 2, 7(a) and 7(b), the self-centering device 41 can be in the form of an expandable collet 7 that is configured to expand between a retracted configuration 11 during insertion into the hole, and an expanded configuration 13 to center the end effector 9 in the hole 21.

The expandable collet may have an outer surface that this substantially cylindrical so that in the expanded configuration 13 (which will be close to or same as the template hole diameter), the outer surface is in substantially even contact with the corresponding cylindrical wall 22 of the hole 21. It is to be appreciated that the outer surface may have some slots to facilitate the expansion and retraction of the collet 7.

In some examples, the retracted diameter 27 of the expandable collet 7 is at least 95%, but less than 100%, of the template hole diameter of the hole 21. In some examples, the retracted diameter 27 of the expandable collet 7 is in the range of 95% to 97% of the template hole diameter. In some other examples, the retracted diameter 27 of the expandable collet 7 is in the range of 97% to 99% of the template hole diameter. In some further examples, the retracted diameter 27 of the expandable collet is in the range of at least 99% but less than 100% of the template hole diameter.

The expanded configuration 13 of the expandable collet 7 may include an expanded diameter 28 that is at, or approximately 100% of the anticipated template hole diameter. This can provide a tight and precise fit so that there is confidence that the end effector 9 is centered and correctly aligned with the hole 21.

In some further examples, the expandable collet 7 is configured to enable the expandable collet to have an unconstrained expanded diameter 28 to be greater than the anticipated template hole diameter. This enables the expandable collet 7 to expand towards a greater expanded diameter 28 to tightly fit the expandable collet 7, and the respective tool head 5, in the hole 21 of the drill template 23. This can be useful for a further function of securing the tool head 5 in the hole 21 during activation of the end effector 9.

In some examples, a collet sensor 53 is configured to output a collet sensor output that is indicative of force between the expandable collet 7 and the wall of the hole 21. When expanding toward the expanded configuration, the diameter of the expandable collet 7 is expanded until the collet sensor output achieves or exceeds a threshold value. This can be useful for limiting the amount of expansion of the expandable collet 7 to prevent damage to the drill template 23. The collet sensor output may also be used as an indicator that the expandable collet is in tight fit and secured to the hole 21.

In some examples, the expandable collet 7 is configured to expand and retract with a pneumatic system. This may include using pneumatic actuators to expand the expandable collet 7. In some examples, specifying or otherwise controlling pressure in a pneumatic cylinder of the pneumatic system controls the force that the expandable collet 7 imparts to the wall of the hole 21 of the drill template 23.

Lead-In Chamfer 27

The robotic manipulator arm 15 is configured to insert at least part of the tool head 5 into the hole 21 of the drill template 23, which can be considered as a peg-in-hole movement. To aid insertion of the tool head 5, the tool head 5 may include a lead-in chamfer 29. The lead-in chamfer 29 that includes a lead-in edge 31, where the lead-in edge has a lead-in diameter 34 that is less than the retracted diameter 27 of the expandable collet 7. In some examples, the lead-in diameter is at least 75% of a template hole diameter of the hole 21. In other examples, the lead-in diameter is at least 80% of the template hole diameter 2×5. In yet further examples, the lead-in diameter is at least 90% of the template hole diameter. In another example, the lead-in diameter is at least 95% of the template hole diameter.

In some examples, the lead-in chamfer includes a frusto-conical-shaped portion.

Robotic Manipulator Arm 15 and Robotic Actuators 17

The robotic manipulator arm 15 can articulate in multiple degrees of freedom. In some examples, this can include a robotic manipulator arm 15 that can translate the tool head 5 in an x, y, and z axis. The robotic manipulator arm 15 may also rotate the tool head 5 around a respective x, y, and z axis.

The robotic manipulator arm 15 is moved by one or more robotic actuator(s) 17. The robotic actuators 17 may include linear or rotary motors, pneumatic actuators, hydraulic actuators, or combinations thereof.

The robotic manipulator arm 15, in conjunction with sensors and a controller 30, may be configured to a drive mode or a freedrive mode. In a drive mode, the controller 30 receives instructions to move the manipulator arm to cause insertion of the tool head, and in response sends control signals to selectively activate one or more of the robotic actuators 17 to effect that insertion motion. The drive mode may also be used for other desired movements of the robotic manipulator arm of tool head 5, such as retraction of the tool head 5 from the hole 21 and movement of the tool head 5 towards another hole of the drill template 23.

The robotic manipulator arm 15 may also be configured to a compliant freedrive mode (also known as "zero gravity" mode). In the compliant freedrive mode, the robotic manipulator arm 15 is configured to be freely repositionable to facilitate movement of the tool head. The robotic manipulator arm 15 and displace (include translation and rotation) based on external forces applied to the robotic manipulator arm 15 or tool head 5. This can include sensors in the robotic manipulator arm detecting external forces to components of the robotic manipulator arm 15 and actuating the robotic actuators 17 to follow the forces and/or movements.

The compliant freedrive mode enables the tool head 5 and end effector 9 to move to the corrected alignment 43 of the tool head axis 49 relative to the hole 21 by forces generated when the self-centering device 41 is activated.

Sensor 19

The robotic drill system 1 includes one or more sensors 19, 19', 19" to detect binding of the expandable collet 7 to the hole 21. In some examples, the sensor 19 may be similar to, or the same as, the collet sensor 53 that detects forces directed to the expandable collet 7.

In other examples, sensors 19, 19', 19" may indirectly detect binding of the tool head 5 to the wall of the hole. For example, measuring forces on other parts of the robotic manipulator arm 15 or metrics associated with the robotic actuators 17.

In some examples, the sensors 19 may include a sensor to detect change in current, voltage and/or heat at the at least one robotic actuator 17. This can be used to infer forces resistance of movement at the tool head 5 that is indicative of binding.

In some examples, the sensors 19 include a force sensor to detect at least one force at the tool head 5, expandable collet 7, robotic actuator 17, robotic manipulator arm 15, or the drill template 23. In some examples, the force sensor may be a magnitude based sensor to detect forces. In some examples, this can be based on a lower cost sensor that detects force in any direction (in contrast to a higher cost sensor that detects force(s) in specific component directions).

In some examples, the sensors 19 may include an accelerometer to detect changes in acceleration of the collet 7 or the tool head 5.

In some examples, the sensor detects changes in electrical continuity or capacitance between the collet 7 or tool head 5 and the drill template 23.

In some examples, the tool head 3 is provided with a tool head sensor to detect that the tool head 3 has been inserted to a specified position (such as a proper depth of the tool head 3 in the hole 21 of the drill template 23). This can included an inductive sensor to detect the presence of ferrous metals. In some examples, the drill template 23 includes ferrous metals, whereby the inductive sensor provides an output based on detecting proximity to the ferrous metals of the drill template 23. This can be used as part of an interlock system for the end effector 9, whereby the end effector 9 can only be selectively activated if the inductive sensors provide an output indicative of the tool head 3 at a specified position. In some examples, the specified position may include a range of distance between the tool head sensor at the tool head and the drill template 23. In one example, the range may include 1 to 2 mm between the tool head sensor and the drill template 23.

In other examples, the tool head may be provided with optical range sensors to provide an output indicative of relative distance between the tool head 3 and the drill template. This can be used to determine if the tool head 3 has advanced to a specified depth in the hole 21 of the drill template 23.

The sensors 19 of the robotic drill system 1 may also include position sensors to send position sensor signals that is indicative of position and/or alignment of the tool head 5. This can include determining the position and/or alignment of the tool head at the corrected alignment. In some examples, this can include rotary encoders associated with the robotic manipulator arm 15, robotic actuators 17, and tool head 3. This information, that can include relative information of the position and/or alignment of the tool head 5 relative to the robotic drill system 1, can be used by the controller to calculate the updated insertion trajectory.

Limited Granularity Sensor 33

The robotic drill system 1 may include a limited granularity sensor 33 to provide limited granularity sensor feedback signals 35 to guide insertion of the tool head 5 towards the hole 21 along the initial insertion trajectory.

In some examples, the limited granularity sensor 33 is a camera. The limited granularity sensor feedback signal 35 may include images (or video) of the tool head 5 (or other components of the robotic manipulator arm 15) relative to the hole 21 of the drill template 23. This information can be used by the controller 30 to determine an initial insertion trajectory 37 that is close enough to initially insert part of the tool head 5 into the hole 21. After initial insertion, and if the accuracy provided by the limited granularity sensor is insufficient for precise placement of the tool head 5 into the hole 21, the above mentioned method of using the self-centering device 41 is used to correct the alignment of the tool head 5.

In some examples, the limited granularity sensor 33 includes a depth camera with depth sensing capabilities. For example a system with multiple cameras to provide stereo depth data. In other examples, the limited granularity sensor 33 includes coded light depth camera(s) that include projecting a light pattern and capturing the reflected light pattern to determine depth.

The advantage of using a limited granularity sensor 33, such as a video camera, is the low cost. The video camera is also adaptable in that it can be configured to have a wide field of view to allow operations on a large drill template 23 and work piece 8. This also enables a robotic drill system 1 that can be movable and easily set up and initialized. This can be in contrast with systems that rely on expensive laser scanners that require precise alignment and calibration of components.

Controller 30

A controller 30 may include one or more processors to execute computer-readable program code stored on a non-transitory computer-readable storage medium. The controller may include a computer, a computer system, or distributed computer system on a network. In other examples, the controller 30 can include a microcontroller, including a reduced instruction set computer.

The controller 30 is configured to execute program instruction code to perform the method 100 and control the robotic drill system 1. This can include receiving sensor signals from sensors 19, 53, and sending control signals to robotic actuators 17, the self-centering device 41, and end effector 9. Controller 30 can also be used to compute control signals and insertion trajectories for the robotic drill system 1. An example of this is the execution of program code to cause a computer system to perform method 200 illustrated in FIG. 6.

Drill Template 23 and Work Piece 8

The drill template 23 may be constructed of a stable and stiff material. This can include a material selected with minimal thermal expansion or contraction in the operating temperature range to minimize variance in the location of the hole(s) 21. In some examples, the drill template 23 may be constructed of metal alloys. In some examples, the drill template 23 is constructed of a ferrous metal or ally, or semi-ferrous alloy (such as a semi-ferrous aluminum alloy).

The work piece 8 may include a variety of solid materials that require drilling. This can include composite materials (e.g. fiber reinforced plastics), metal alloys, wood etc. In some examples, the work piece 8 may be a component of an aircraft.

During robotic drilling, the drill template 23 is preferably located to the work piece 8 in a consistent manner. This may include mounting the drill template 23 relative to the work piece 8. In some examples, this can include clamping the drill template 23 to the work piece 8, fastening the drill template 23 to the work piece, or otherwise locating the drill template 23 to the work piece 8 with a jig.

Method 100 of Robotic Drilling

A specific example of a method 100 of robotic drilling will now be described with reference to FIGS. 3 to 6. The example will be described with reference to the corresponding sequence illustrated in FIGS. 2(*a*) to 2(*f*).

The method includes the controller 30 computing 210 initial control signals to robotic actuators 17 for inserting the tool head 3 towards the hole 21 of the drill template 23 along an initial insertion trajectory 37. This can include receiving from the limited granularity sensor feedback signals 35 the position and/or orientation of the tool head 3 relative to the hole 21 and calculating the initial insertion trajectory 37 to place the tool head 3 into the hole 21.

The initial control signals are then sent 220 to the robotic actuators 17 so that the robotic manipulator arm 15 can insert 110 the tool head 3 into the hole 21 along the initial insertion trajectory 37. When inserting the tool head 3, the expandable collet 7 is typically in a retracted configuration 11.

As the tool head 3 is inserted along the initial insertion trajectory 37, there may be minor errors that cause the tool head 3 to be imprecisely aligned with the hole 21. These errors can be cause by errors in the sensors, calibration issues, errors in calculation, etc. As a result, the tool head 3 may enter the hole 21 (aided by the lead-in chamfer) and then bind to the wall 22 of the hole 21. This is best illustrated in FIG. 2(*a*) where the tool head is inserted along the initial insertion trajectory 37 that is off-axis to the hole axis 51. As a result, the expandable collet 7 in the retracted configuration 11 contacts and binds to portions of the wall 22.

The sensors 19 sense 120 binding of the tool head 3 to the wall 22 and, in response, send sensor signals indicative of this state to the controller 30. The controller 30 on receiving 230 these sensor signals, then determines 240 binding of the tool head to the wall 22. In response, the controller sends 250 control signals to stop 122 robotic insertion of the tool head 5 and activation control signals to activate 130 the self-centering device 41 to reorient and reposition the tool head 5 to the corrected alignment 43.

To facilitate the repositioning movement to the corrected alignment 43, the robotic drill system 1 may be switched 124 to the compliant freedrive mode to allow forces generated with activating 130 of the self-centering device 41 move the tool head 3. In the example of FIG. 2(c), activating the self-centering device includes expanding the expandable collet 7 of the tool head 5 towards the wall 22 of the hole 21. To provide precise corrected alignment, this can include expanding the expandable collet 7 until achieving a threshold value of force between the expandable collet 7 and the wall 22. This can be determined based on the collet sensor outputs of the collet sensor 53.

The corrected alignment 43 may include placing the tool head 3 so that the tool head axis 49 is coaxial with the hole axis 51. This movement is best illustrated in the transition from FIGS. 2(b) and 2(c) where the expandable collet 7 (as the self-centering device 41), expands to an expanded configuration so that the cylindrical outer surface of the expandable collet 7 is substantially flush with the wall 22 of the hole 21. At FIG. 2(c) the tool head 3 is shown with a corrected alignment 43 where the tool head axis 49 is centered with the hole axis 51.

One or more self-centering device sensors (such as collet sensor 53) may detect that the tool head 3 is in the corrected alignment 43 and send a corresponding self-centering device sensor output signal to the controller 30. On receiving 245 the sensor signal indicative of the corrected alignment, the controller 30 sends 246 a deactivation control signal to deactivate the self-centering device 41.

At the tool head 3, the self-centering device 41 is deactivated 134. As illustrated in FIG. 2(d), this can include configuring the expandable collet 7 in a retracted configuration 11.

The next step is to proceed with further insertion of the tool head 3 into the hole 21. To achieve this the controller 30 configures 132 the robotic manipulator arm 15 back to a drive mode so that selective activation of the robotic actuators 17 can cause further insertion of the tool head 3.

Figure 4:
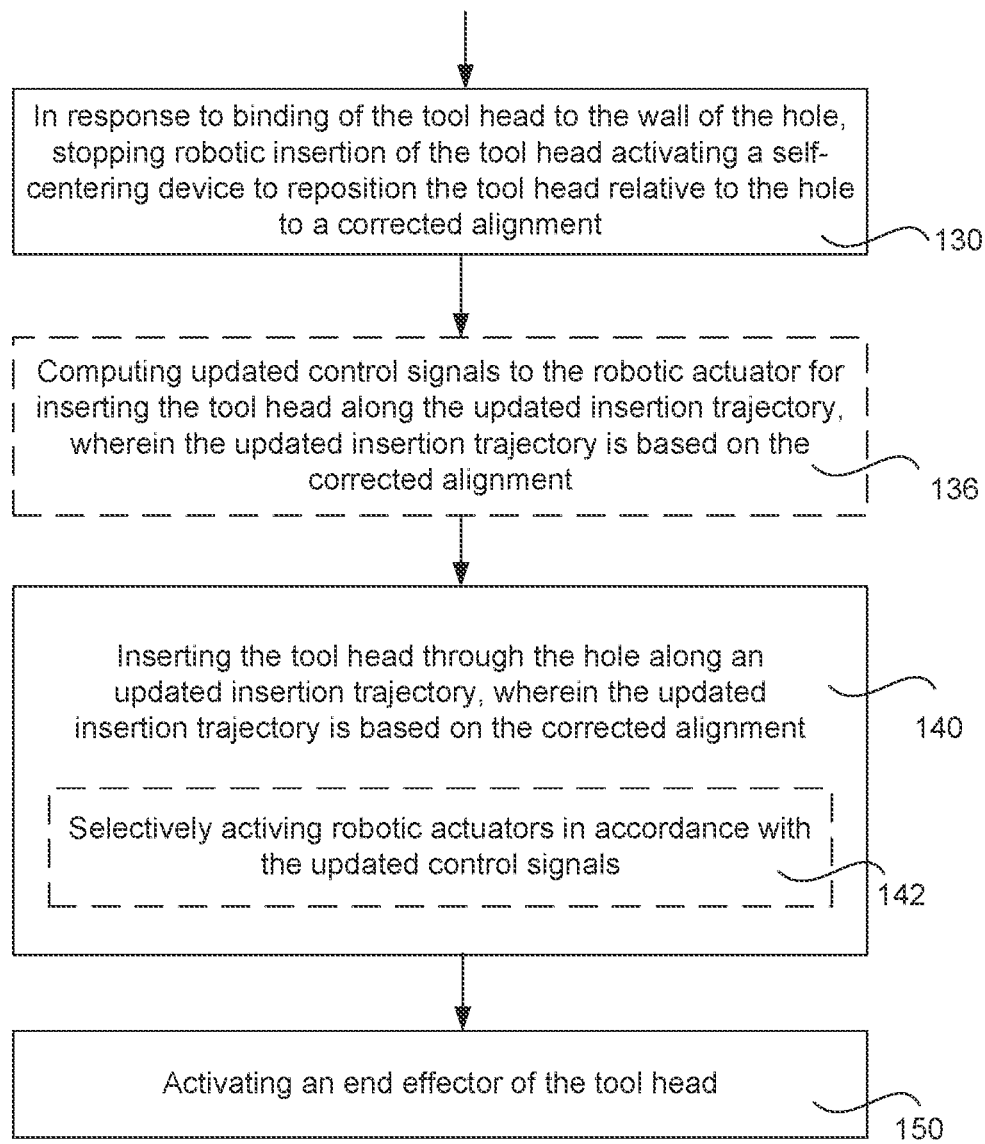
FIG. 4 is a flow diagram of additional steps in the method of drilling, including computing updated control signals to insert the tool head along an updated insertion trajectory.
Figure 6:
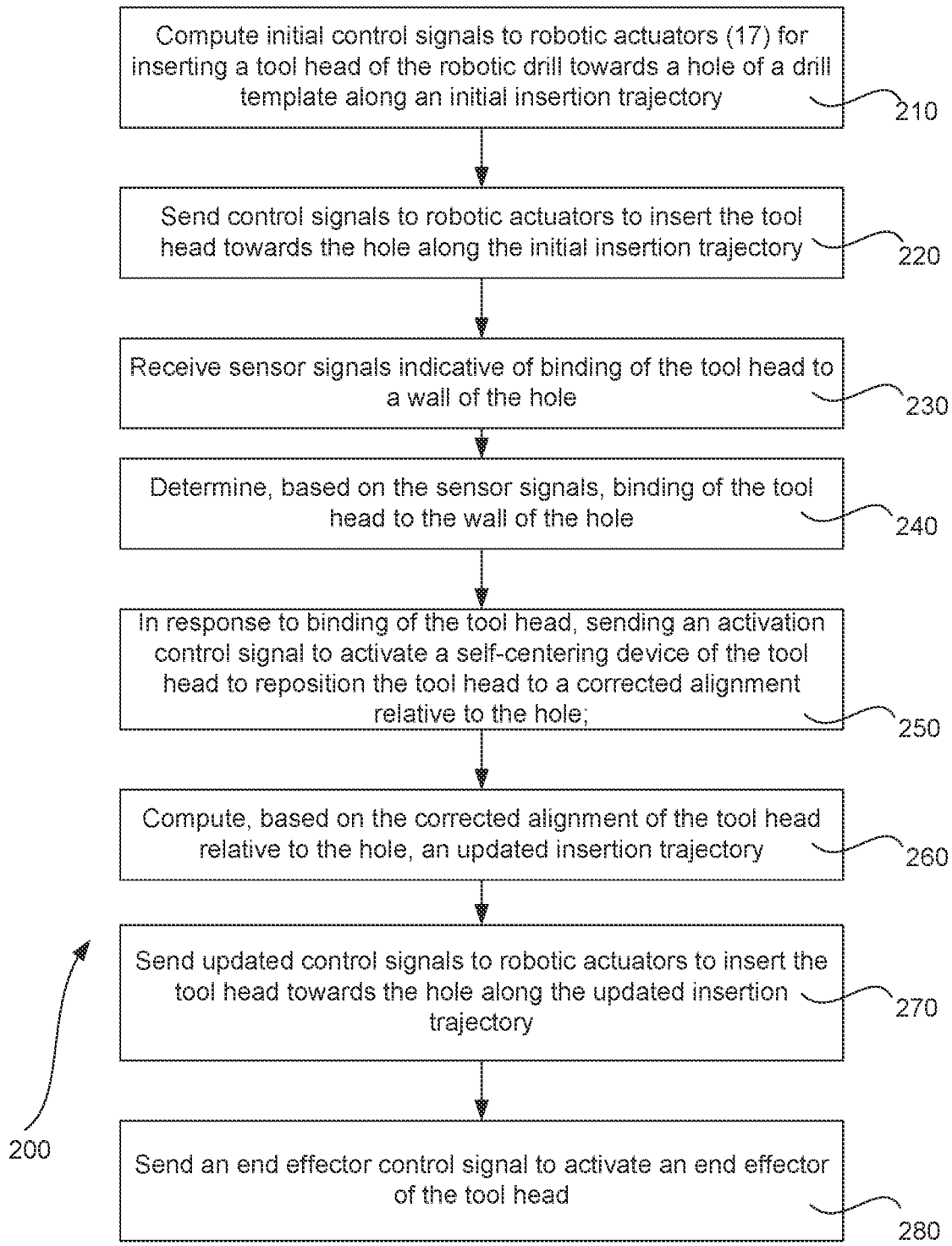
FIG. 6 is a flow diagram of an exemplary embodiment of a computer-implemented method of controlling a robotic drill system.

The controller 30 is also configured to compute 260, based on the corrected alignment 43, an updated insertion trajectory 45. As illustrated in FIGS. 4 and 6, this may include computing 136 the require control signals to advance the tool head 3 along the current tool head axis 49 that is centered with the hole axis 51. To compute the corrected alignment, the controller 30 may receive 262 from one or more tool head position sensors, a position sensor output indicative of the position and/or alignment of the tool head 3 at the corrected alignment. The controller 30 may then compute the updated insertion trajectory based, at least in part, on this received position sensor output. In some examples, this updated position sensor output can be used to recalibrate the robotic drill system 1.

The controller 30 sends 270 updated control signals to selectively 142 activate the robotic actuators 17 to drive the robotic manipulator arm 15 so that the tool head 3 is inserted 140 into the hole 21 along the updated insertion trajectory 45. This is best illustrated in FIG. 2(e) where the tool head 3, with the retracted expandable collet 7, is inserted into the hole 21.

Figure 5:
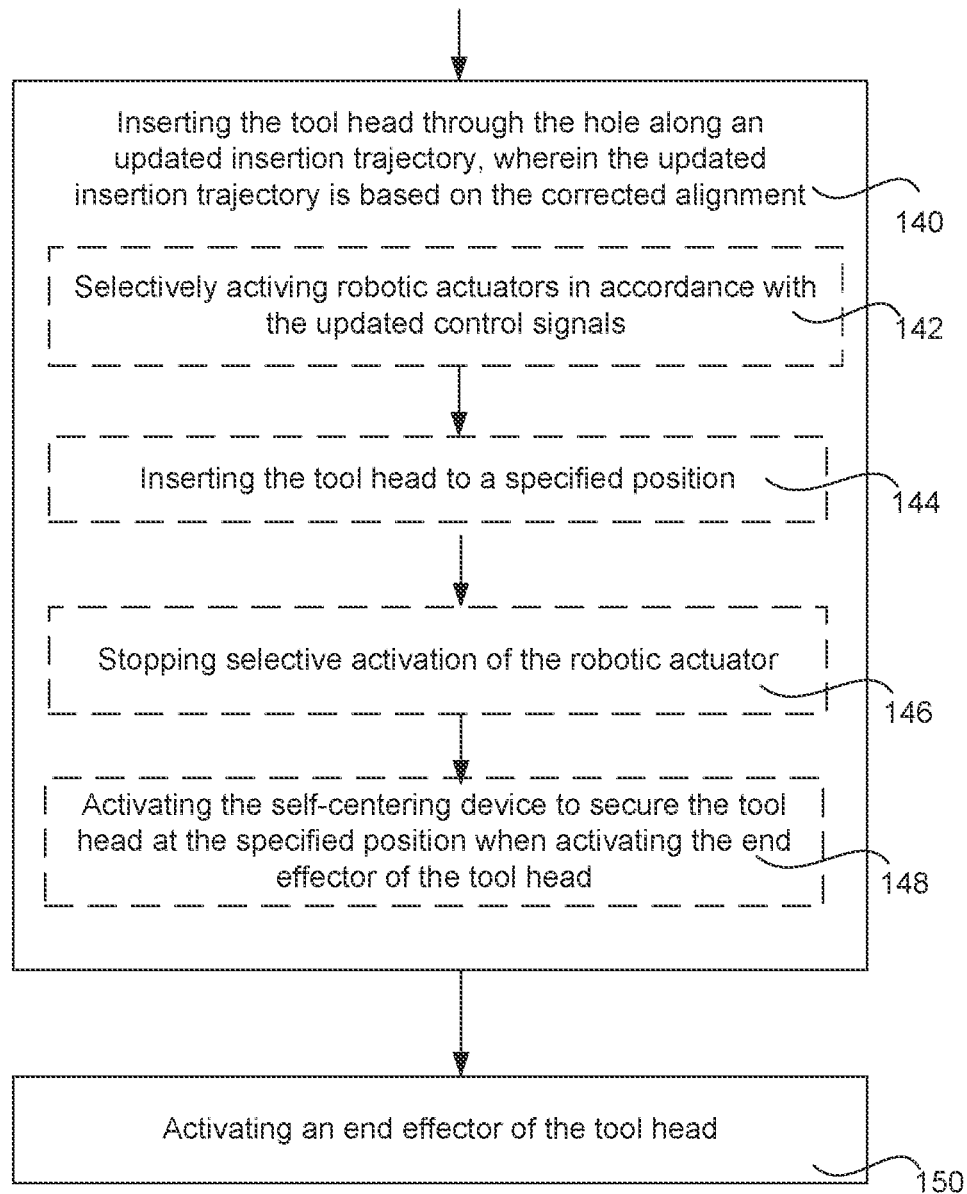
FIG. 5 is a flow diagram of additional steps in the method of drilling, including securing the tool head to the hole of the drill template.

One or more tool head sensors 55 detect the position or further movement of the tool head 3, during further advance along the updated insertion trajectory 45. The tool head sensor 55 (such as an inductive sensor or optical sensor described above) sends a tool head sensor signal indicative of the tool head 5 inserted 144 at a specified position in the hole 21. In some examples as illustrated in FIG. 5, this includes the tool head 5 achieving a specified depth within the hole 21. The controller 30, in response to receiving 275 the tool head sensor signal indicative of the tool head 5 at the specified position 47, then sends a control signal to stop 146 further activation of the robotic actuators 17 so that further insertion is stopped. The controller 30 also sends 276 an activation control signal to activate 148 the self-centering device 41 of the tool head to secure the tool head 3 at the specified position relative to the hole 21.

In some examples, expanding the expandable collet 7 can draw the tool head 3 to move further into the hole 21 of the drill template 23. In other examples, expanding the expandable collet 7 can cause the tool head 3 to slightly withdraw away from the hole 21 of the drill template 23. It is to be appreciated that the specified position can be offset to compensate for such movements so that the end effector 9 located at a desired relative position in the hole 21 during activation.

In response to the tool head 3 secured at the specified position, the controller 30 further sends 280 an end effector control signal to activate 150 the end effector 9 of the tool head 3.

This is best illustrated in FIG. 2(f) where the expandable collet 7 is in the expanded configuration 13 to secure the tool head 3 to the wall 22 of the hole 21, the end effector 9 is activated to drill a hole in the work piece 8. This can include the end effector 9 further advancing forward through the tool head axis 49 relative to the expandable collet 7 secured to the hole 21.

Once operation of the end effector 9 in the hole is performed, the robotic drill system 1 can withdraw the tool head 3 from the hole 21 and proceed to insertion into another hole of the drill template to perform subsequent operations on the work piece 8.

CLAUSES

The disclosure comprises example embodiments in accordance with the following clauses:

Clause 1. A robotic drill system (1) comprising:
a tool head (5) comprising an expandable collet (7) and an end effector (9), wherein the expandable collet (7) is configured to expand between a retracted configuration (11) for insertion into a hole (21) of a drill template (23) and an expanded configuration (13);
a robotic manipulator arm (15) to support the tool head (5);
at least one robotic actuator (17) to move the robotic manipulator arm (15) for causing robotic insertion of the tool head (5) towards a hole (21) of a drill template (23);
at least one sensor (19) to detect binding of the expandable collet (7) within the hole (21) of the drill template (23),
wherein in response to detecting binding of the expandable collet (7) within the hole (21), robotic insertion of the tool head (5) is stopped and the expandable collet (7) is configured to expand to the expanded configuration (13) to center the end effector (9) in the hole (21), and
wherein a retracted diameter (27) of the expandable collet (7) in the retracted configuration (11) is at least 95%, but less than 100%, of a template hole diameter of the hole (21).

Clause 2. A robotic drill system (1) according to Clause 1, wherein in response to detecting binding of the expandable collet (7) within the hole (21), robotic insertion is stopped and the robotic manipulator arm (15) and at least one actuator (17) are switched to a compliant freedrive mode in which the robotic manipulator arm is freely repositionable to a corrected alignment relative to the hole by forces generated with expanding (130) the expandable collet (7) of the tool head (5).

Clause 3. A robotic drill system (1) according to either Clause 1 or 2, further comprising:
- a limited granularity sensor (33) to provide limited granularity sensor feedback signals (35) to guide insertion of the tool head (5) towards the hole (21) along an initial insertion trajectory (37).

Clause 4. A robotic drill system (1) according to Clause 3 wherein the limited granularity sensor (33) is a video camera or depth camera system.

Clause 5. A robotic drill system (1) according to any of Clauses 1 to 4, wherein the retracted diameter (27) is in the range of at least one of:
- (i) 95% to 97% of the template hole diameter;
- (ii) 97% to 99% of the template hole diameter; or
- (iii) at least 99% but less than 100% of the template hole diameter.

Clause 6. A robotic drill system (1) according to any of Clauses 1 to 5 wherein the tool head (5) includes a lead-in chamfer (29) to aid insertion of the tool head (5) into the hole (21), wherein the lead-in-chamfer (29) includes a lead-in edge (31) with a lead-in diameter (34) that is less than the retracted diameter (27) and at least 75% of the template hole diameter.

Clause 7. A robotic drill system (1) according to any one of Clauses 1 to 6, wherein the at least one sensor (19) to detect binding comprise one or more of:
- a sensor to detect change in current, voltage and/or heat at the at least one robotic actuator (17);
- a force sensor to detect at least one force at one or more of the tool head (5), collet (7), robotic actuator (17), or the drill template (23);
- an accelerometer to detect changes in acceleration of the collet (7) or tool head (5); and
- a sensor to detect changes in electrical continuity or capacitance between the collet (7) or tool head (5) and the drill template (23).

Clause 8. A robotic drill system (1) according to any one of Clauses 1 to 7 further comprising:
- a collet sensor (53) to output a collet sensor output that is indicative of force between the expandable collet (7) and a wall (22) of the hole (21),
- wherein to configure the expandable collet (7) to the expanded configuration (13) includes expanding the diameter of the expandable collet (7) until the collet sensor output achieves or exceeds a threshold value.

Clause 9. A method of drilling with a robotic drill system (1) comprising:
- inserting (110) a tool head (5) of the robotic drill (3) within a hole (21) of a drill template (23) along an initial insertion trajectory (37) with a robotic manipulator arm (15) that is moved by at least one robotic actuator (17) for causing robotic insertion of the tool head (5);
- sensing (120) binding of the tool head to a wall (22) of the hole (21);
- in response to binding of the tool head (5) to a wall (22) of the hole (21) while inserting the tool head (5) along the initial insertion trajectory (37), stopping (122) robotic insertion of the tool head (5) and activating (130) a self-centering device (41) of the tool head (5) to reorient the tool head (5) to a corrected alignment (43) of the tool head axis (49) relative to the hole (21);
- inserting (140) the tool head into the hole (21) along an updated insertion trajectory (45), wherein the updated insertion trajectory is based on the corrected alignment (43); and
- activating (150) an end effector (9) of the tool head (5).

Clause 10. A method of drilling according to Clause 9, wherein in response to binding of the tool head (5) to the wall (22), the method further comprises:
- stopping (122) robotic insertion of the tool head (5) towards the hole (21) along the initial insertion trajectory (37):
- switching (124) the robotic manipulator arm to a compliant freedrive mode to facilitate repositioning movement of the tool head (5) to the corrected alignment (43) of the tool head axis (49) relative to the hole (21) by forces generated with activating (130) the self-centering device (41) of the tool head (5), and
- wherein subsequent to activating the self-centering device (41) of the tool head (5) to reposition the tool head (5) to the corrected alignment relative to the hole (21), the method further comprises:
  - configuring (132) the robotic manipulator arm (15) to a drive mode whereby selective activation of at least one robotic actuator (17) moves the robotic manipulator arm (15) for causing robotic insertion of the tool head (5); and
  - deactivating (134) the self-centering device of the tool head.

Clause 11. A method according to Clause 10, wherein subsequent to activating (130) the self-centering device of the tool head to reposition the tool head (5) to the corrected alignment relative to the hole (21), the method further comprises:
- computing (136) updated control signals for inserting the tool head (5) along the updated insertion trajectory (45); and
- wherein inserting (140) the tool head into the hole along the updated insertion trajectory comprises:
  - selectively (142) activating the robotic actuator (17) in accordance with the updated control signals.

Clause 12. A method of drilling according to Clause 11, wherein inserting the tool head (5) into the hole (21) along an updated insertion trajectory (45) further comprises:
- inserting (144) the tool head (5) to a specified position (47); and
- in response to the tool head positioned at the specified position (47), the method further comprises:
  - stopping (146) selective activation of the robotic actuator (17); and
  - activating (148) the self-centering device (41) of the tool head (5) to secure the tool head (5) at the specified position (47) when activating the end effector (9) of the tool head (5).

Clause 13. A method of drilling according to any one of Clauses 9 to 12 wherein the corrected alignment (43) of the tool head (5) relative to the hole (21) includes: centering a tool head axis (49) of the tool head (5) with a hole axis (51) of the hole (21).

Clause 14. A method according to any one of Clauses 9 to 13 wherein sensing (120) binding of the tool head (5) to a wall (22) of the hole (22) comprises one or more of:
- detecting force at one or more of the self-centering device (41), tool head (5), robotic actuators (17) of the robotic drill (3) or drill template (23);
- detecting changes in electrical continuity or capacitance between the self-centering device (41) or tool head (5) and the drill template;

detecting change in acceleration of the self-centering device (41) or tool head (5);

detecting changes in current, voltage, heat at actuators or other components of the robotic drill (3).

Clause 15. A method according to any one of Clauses 9 to 14 wherein activating (130, 148) the self-centering device of the tool head (5) comprising expanding a collet (7) of the tool head (5) towards a wall (22) of the hole (21).

Clause 16. A method according to Clause 15, wherein activating (130, 148) the self-centering device comprises expanding the collet (7) of the tool head (5) until achieving or exceeding a threshold value of force between the collet (7) and the wall (22).

Clause 17. A non-transitory computer-readable storage medium that has computer-readable program code stored therein that, when executed by a processor, causes a computer system to at least:

compute (210) initial control signals to robotic actuators (17) for inserting a tool head of the robotic drill towards a hole of a drill template along an initial insertion trajectory;

send (220) control signals to robotic actuators to insert the tool head towards the hole along the initial insertion trajectory;

receive (230) sensor signals indicative of binding of the tool head (5) to a wall (22) of the hole (21);

determine (240), based on the sensor signals, binding of the tool head to the wall (22) of the hole (21), and in response, send (250) an activation control signal to activate a self-centering device (41) of the tool head (5) to reposition the tool head to a corrected alignment relative to the hole;

compute (260), based on the corrected alignment of the tool head (5) relative to the hole, an updated insertion trajectory;

send (270) updated control signals to robotic actuators to insert the tool head towards the hole along the updated insertion trajectory; and send (280) an end effector control signal to activate an end effector of the tool head.

Clause 18. A non-transitory computer-readable storage medium according to Clause 17, when executed by a processor, causes at computer system to further:

receive (262), from one or more position sensors, position sensor signals indicative of position and/or alignment of the tool head at the corrected alignment, wherein to compute (260) an updated insertion trajectory includes the system to compute an updated insertion trajectory based on the position sensor signals of the tool head at the corrected alignment.

Clause 19. A non-transitory computer-readable storage medium according to Clause 18, wherein at the corrected alignment, a tool head axis (49) is centered with a hole axis (51) of the hole, and wherein to compute (260) an updated insertion trajectory (260) includes the system to compute an updated insertion trajectory along the tool head axis (49) of the centered tool head (5).

Clause 20. A non-transitory computer-readable storage medium according to any one of Clauses 17 to 19, wherein to compute (210) initial control signals to robotic actuators (17) comprises the computer system to:

receive, from a limited granularity sensor (33), limited granularity sensor feedback signals (35) on the position or orientation of the tool head (5) relative to the hole (21) of the drill template (23);

wherein the initial control signals are, at least in part, based on the limited granularity sensor feedback signals (35).

Clause 21. A non-transitory computer-readable storage medium according to any one of Clauses 17 to 20, when executed by the processor, causes the computer system to further:

receive (245), from a self-centering device sensor (53), a self-centering device sensor output indicative of the tool head (5) in the corrected alignment (43) relative to the hole (21), and in response to receiving the self-centering device sensor output indicative of the tool head (5) in the corrected alignment (43), sending (246) a deactivation control signal to deactivate the self-centering device (41) of the tool head (5).

Clause 22. A non-transitory computer-readable storage medium according to any one of Clauses 17 to 21, when executed by the processor, causes the computer system to further:

receive (275), from a tool head sensor (55), a tool head sensor signal indicative of the tool head (5) at a specified position (47) in the hole (21);

in response to the tool head positioned at the specified position, send (276) a activation control signal to activate the self-centering device (41) of the tool head to secure the tool head at the specified position relative to the hole (21), wherein in response to the tool head secured at the specified position relative to the hole, the computer system is caused to send (280) the end effector control signal to activate the end effector of the tool head.

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A robotic drill system comprising:
a tool head comprising an expandable collet and an end effector, wherein the expandable collet is configured to expand between a retracted configuration for insertion into a hole defined in a drill template and an expanded configuration;
a robotic manipulator arm to support the tool head;

at least one robotic actuator to move the robotic manipulator arm to produce a robotic insertion of the tool head towards the hole of the drill template; and at least one binding sensor to detect a misalignment-induced binding of the expandable collet to a wall of the hole of the drill template before the end effector reaches a specified position, wherein in response to detecting the misalignment-induced binding of the expandable collet within the hole, (i) the robotic insertion of the tool head is stopped, and (ii) the expandable collet is configured to expand to the expanded configuration to center the end effector in the hole, and wherein a retracted diameter of the expandable collet in the retracted configuration is at least 95%, but less than 100%, of a template hole diameter of the hole.

2. The robotic drill system according to claim 1, wherein in response to detecting the misalignment-induced binding of the expandable collet within the hole, the robotic manipulator arm and the at least one robotic actuator are switched to a compliant freedrive mode in which the robotic manipulator arm is freely repositionable to a corrected alignment relative to the hole by forces generated with expanding the expandable collet of the tool head.

3. The robotic drill system according to claim 1, further comprising:

a limited granularity sensor to provide limited granularity sensor feedback signals to guide insertion of the tool head towards the hole along an initial insertion trajectory.

4. The robotic drill system according to claim 3, wherein the limited granularity sensor is a video camera or a depth camera system.

5. The robotic drill system according to claim 1, wherein the retracted diameter is in a range of at least one of:
    (i) 95% to 97% of the template hole diameter;
    (ii) 97% to 99% of the template hole diameter; or
    (iii) at least 99% but less than 100% of the template hole diameter.

6. The robotic drill system according to claim 1, wherein the tool head includes a lead-in chamfer to aid insertion of the tool head into the hole, and wherein the lead-in chamfer includes a lead-in edge with a lead-in diameter that is less than the retracted diameter and at least 75% of the template hole diameter.

7. The robotic drill system according to claim 1, wherein the at least one binding sensor comprises one or more of:
    a first sensor to detect change in current, voltage and/or heat at the at least one robotic actuator;
    a force sensor to detect at least one force at one or more of the tool head, the at least one robotic actuator, or the drill template;
    an accelerometer to detect changes in acceleration of the expandable collet or the tool head; and
    a second sensor to detect changes in electrical continuity or capacitance between the expandable collet or the tool head and the drill template.

8. The robotic drill system according to claim 1, further comprising:
    a collet sensor to output a collet sensor output signal that is indicative of a force between the expandable collet and the wall of the hole, wherein to configure the expandable collet to the expanded configuration includes expanding a diameter of the expandable collet until the collet sensor output signal achieves or exceeds a threshold value.

9. A method of drilling with a robotic drill system comprising:

inserting a tool head of the robotic drill system within a hole defined in a drill template along an initial insertion trajectory with a robotic manipulator arm that is moved by at least one robotic actuator to produce a robotic insertion of the tool head, wherein (i) the robotic manipulator arm supports the tool head, (ii) the tool head comprises an expandable collet and an end effector, and (iii) the expandable collet is configured to expand between a retracted configuration for insertion into the hole of the drill template and an expanded configuration;

detecting, with at least one binding sensor, a misalignment-induced binding of the tool head to a wall of the hole before the end effector reaches a specified position;

in response to the detecting of the misalignment-induced binding of the tool head to the wall of the hole while inserting the tool head along the initial insertion trajectory, (i) stopping the robotic insertion of the tool head, and (ii) expanding the expandable collet to the expanded configuration to center the end effector in the hole in a corrected alignment;

inserting the tool head further into the hole along an updated insertion trajectory, wherein the updated insertion trajectory is based on the corrected alignment; and activating the end effector of the tool head, wherein a retracted diameter of the expandable collet in the retracted configuration is at least 95%, but less than 100%, of a template hole diameter of the hole.

10. The method of drilling according to claim 9,
wherein in response to the detecting of the misalignment-induced binding of the tool head to the wall, the method further comprises:

stopping the robotic insertion of the tool head into the hole along the initial insertion trajectory; and switching the robotic manipulator arm to a compliant freedrive mode to facilitate repositioning movement of the tool head to the corrected alignment relative to the hole by forces generated with the expanding of the expandable collet to the expanded configuration, and wherein subsequent to the expanding of the expandable collet to reposition the tool head to the corrected alignment relative to the hole, the method further comprises:

retracting the expandable collet to the retracted configuration; and configuring the robotic manipulator arm to a drive mode whereby selective activation of the at least one robotic actuator moves the robotic manipulator arm to produce further robotic insertion of the tool head into the hole.

11. The method according to claim 10,
wherein subsequent to the expanding of the expandable collet to reposition the tool head to the corrected alignment relative to the hole, the method further comprises:

computing a plurality of updated control signals for inserting the tool head along the updated insertion trajectory, and wherein the inserting of the tool head into the hole along the updated insertion trajectory comprises:

selectively activating the at least one robotic actuator in accordance with the plurality of updated control signals.

12. The method of drilling according to claim 11, wherein the inserting of the tool head into the hole along the updated insertion trajectory further comprises:
- inserting the tool head to the specified position; and
- in response to the tool head positioned at the specified position, the method further comprises:
- stopping selective activation of the at least one robotic actuator; and
- activating a self-centering device of the tool head to secure the tool head at the specified position when activating the end effector of the tool head.

13. The method of drilling according to claim 9, wherein the corrected alignment of the tool head relative to the hole includes:
- centering a tool head axis of the tool head with a hole axis of the hole.

14. The method according to claim 9, wherein the detecting of the misalignment-induced binding of the tool head to the wall of the hole comprises one or more of:
- detecting a force at one or more of a self-centering device of the tool head, the tool head, the at least one robotic actuator of the robotic drill system or the drill template;
- detecting changes in electrical continuity or capacitance between the self-centering device or the tool head and the drill template;
- detecting change in acceleration of the self-centering device or the tool head; and
- detecting changes in current, voltage, heat at actuators or other components of the robotic drill system.

15. The method according to claim 9, wherein the expandable collet is a self-centering device of the tool head.

16. The method according to claim 15, wherein activating the self-centering device comprises:
- expanding the expandable collet of the tool head until achieving or exceeding a threshold value of force between the expandable collet and the wall.

17. A robotic drill system comprising:
- a tool head comprising an expandable collet and an end effector, wherein the expandable collet is configured to expand between a retracted configuration for insertion into a hole defined in a drill template and an expanded configuration;
- a robotic manipulator arm to support the tool head;
- at least one robotic actuator to move the robotic manipulator arm to produce a robotic insertion of the tool head towards the hole of the drill template; and
- at least one binding sensor disposed on the at least one robotic actuator and configured to detect a misalignment-induced binding of the expandable collet to a wall of the hole of the drill template before the end effector reaches a specified position,
- wherein in response to detecting the misalignment-induced binding of the expandable collet within the hole, (i) the robotic insertion of the tool head is stopped, and (ii) the expandable collet is configured to expand to the expanded configuration to center the end effector in the hole.

18. The robotic drill system according to claim 17, wherein the tool head includes a lead-in chamfer to aid insertion of the tool head into the hole, and wherein the lead-in chamfer includes a lead-in edge with a lead-in diameter that is less than the retracted diameter and at least 75% of the template hole diameter.

19. A robotic drill system comprising:
- a tool head comprising an expandable collet and an end effector, wherein the expandable collet is configured to expand between a retracted configuration for insertion into a hole defined in a drill template and an expanded configuration;
- a robotic manipulator arm to support the tool head;
- at least one robotic actuator to move the robotic manipulator arm to produce a robotic insertion of the tool head towards the hole of the drill template; and
- at least one binding sensor disposed on the robotic manipulator arm and configured to detect a misalignment-induced binding of the expandable collet to a wall of the hole of the drill template before the end effector reaches a specified position, wherein in response to detecting the misalignment-induced binding of the expandable collet within the hole, (i) the robotic insertion of the tool head is stopped, and (ii) the expandable collet is configured to expand to the expanded configuration to center the end effector in the hole.

20. The robotic drill system according to claim 19, wherein the at least one binding sensor comprises one or more of:
- a first sensor to detect change in current, voltage and/or heat at the at least one robotic actuator;
- a force sensor to detect at least one force at one or more of the tool head, the at least one robotic actuator, or the drill template;
- an accelerometer to detect changes in acceleration of the expandable collet or the tool head; and
- a second sensor to detect changes in electrical continuity or capacitance between the expandable collet or the tool head and the drill template.

* * * * *